J. GUTHRIE.
BUMPER SUPPORTING MEANS.
APPLICATION FILED JAN. 22, 1920.

1,350,406.

Patented Aug. 24, 1920

Inventor
James Guthrie
By C. E. Dunstan
his Attorney

UNITED STATES PATENT OFFICE.

JAMES GUTHRIE, OF CLEVELAND, OHIO, ASSIGNOR TO THE OHIO MOTOR VEHICLE COMPANY, A CORPORATION OF OHIO.

BUMPER-SUPPORTING MEANS.

1,350,406.   Specification of Letters Patent.   Patented Aug. 24, 1920.

Application filed January 22, 1920. Serial No. 353,255.

*To all whom it may concern:*

Be it known that I, JAMES GUTHRIE, a citizen of the United States, residing at Cleveland, in the county of Cuyahoga and State of Ohio, have invented certain new and useful Improvements in Bumper-Supporting Means, of which the following is a specification.

This invention relates to means for supporting the bumper of automobiles and other vehicles, and has for its main object to provide simple means for supporting bumpers in such a manner that they will not become loose, and as a result thereof produce a noise by rattling. This is accomplished by utilizing the spring tension of the bumper rail to retain it in close contact with its support.

With the above and other objects in view as will be understood, the invention will be hereinafter fully described as illustrated in the accompanying drawings, and the novel features thereof will be distinctly pointed out in the appended claims.

In the drawings, similar characters of reference are used to designate corresponding parts.

Figure 1:
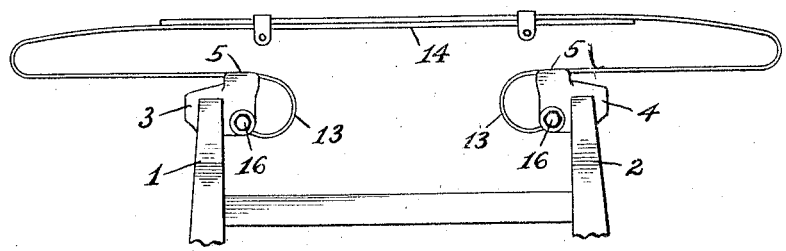
Figure 1 is a plan view of an automobile bumper supported in accordance with my invention.
Figure 2:
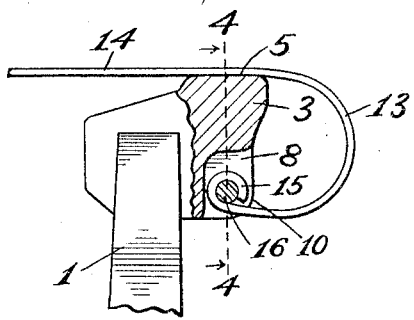
Fig. 2 is an enlarged plan view with parts broken away illustrating one end of the bumper connected to its support.
Figure 3:
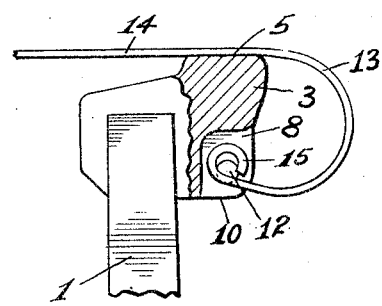
Fig. 3 is a similar view, the end of the bumper being in its contracted form before attachment to its support.
Figure 4:
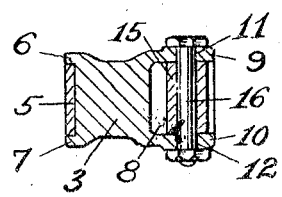
Fig. 4 is a section view taken on line 4—4 of Fig. 2.

Referring to the drawings, 1 and 2 represent the forward ends of the sides of a chassis, to which are fixed in any suitable manner blocks 3 and 4. Each of said blocks is provided with a forwardly extending seat 5 having at its upper and lower end flanges 6 and 7 respectively. Said seat is arranged inwardly and laterally of the side of the chassis to which the block is fixed, and the rear inner side of each block is recessed at 8, leaving upper and lower end flanges 9 and 10, which are provided with alining openings 11 and 12 directly back of the vertical center of the seat. Each end portion 13 of an ordinary bumper rail 14 is bent outwardly toward the block to form a circular spring, and its free end terminates in an eye 15 for receiving a pin or bolt 16 passing through the openings 11 and 12. When the end portion 13 of the bumper rail 14 is formed, the distance from the rear face of the rail to the center of the eye 15, is less than the distance from the seat 5 to the centers of the openings 11 and 12. Consequently when the rail is seated at 5, and the bolt 16 connects its free end to the block by passing through the openings 11 and 12 thereof, the tension of the springy end 13 of the rail causes it to be held in contact with said seat, and thereby prevent noise by rattling.

Having fully described my invention, what I claim is:

1. In a bumper supporting means, the combination of a rail, a block, and means for holding the rail to the block under tension, substantially as described.

2. In a bumper supporting means the combination of a rail, a block, and means for holding the rail to the block under spring tension to prevent movement of the rail relative to the block, substantially as described.

3. In a bumper supporting means, the combination of a rail, a block, the rail having a springy portion, and means for holding the springy portion of the rail in engagement with the block, substantially as described.

4. In a bumper supporting means, the combination of a rail, the rail having its end bent in circular form, a block, the block having a seat, the rail resting against the seat, and means for connecting the free end of the circular portion of the rail to the block to hold the rail in tension against the seat of the block, substantially as described.

5. In a bumper supporting means, the combination of a rail, the rail having its end bent in circular form, the free end of the circular portion of the rail terminating in an eye; a block, the block having a seat, the rail resting against the seat, and means passing through said eye for connecting the rail to the block to hold the rail under tension against said seat, substantially as described.

6. In a bumper supporting means, the combination of a rail, the rail having its end bent in circular form, the free end of the circular portion of the rail terminating in an eye, a block, the block having a seat, the block being provided with a recess for receiving said eye, the block having openings at each side of the recess for receiving a pin, the distance between the inner face of the rail and the center of its eye being less than the distance from the seat of the block and said openings therein, and a pin passing through said openings and said eye when the rail is resting against said seat, substantially as described.

In testimony whereof I affix my signature.

JAMES GUTHRIE.